(12) United States Patent
Vlachou et al.

(10) Patent No.: US 10,608,757 B2
(45) Date of Patent: Mar. 31, 2020

(54) HIGH FREQUENCY RADIO SIGNAL CLASSIFICATIONS

(71) Applicant: HEWLETT PACKARD ENTERPRISE DEVELOPMENT LP, Houston, TX (US)

(72) Inventors: Christina Vlachou, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/718,491

(22) Filed: Sep. 28, 2017

(65) Prior Publication Data

US 2019/0097741 A1    Mar. 28, 2019

(51) Int. Cl.
*H04W 24/00* (2009.01)
*H04B 17/318* (2015.01)
*H04L 27/26* (2006.01)
*H04L 12/26* (2006.01)
*H04W 24/08* (2009.01)
*H04W 84/12* (2009.01)
*H04W 16/14* (2009.01)
*H04W 88/08* (2009.01)

(52) U.S. Cl.
CPC ....... *H04B 17/318* (2015.01); *H04L 27/2628* (2013.01); *H04L 43/16* (2013.01); *H04W 16/14* (2013.01); *H04W 24/08* (2013.01); *H04W 84/12* (2013.01); *H04W 88/08* (2013.01)

(58) Field of Classification Search
CPC . H04L 5/0007; H04L 5/0044; H04L 27/2607; H04L 5/001; H04W 74/006; H04W 56/001; H04W 24/08; H04W 72/0406; H04W 28/0247; H04W 88/02; H04W 76/16; H04W 16/14
See application file for complete search history.

(56) References Cited

U.S. PATENT DOCUMENTS 7,929,508 B1    4/2011  Yucek et al.
9,264,925 B2    2/2016  Zhao et al.
9,510,222 B2*  11/2016  Yerramalli ............. H04B 17/00
(Continued)

FOREIGN PATENT DOCUMENTS

WO    2014/138645 A1    9/2014
WO    2017/112001 A1    6/2017

OTHER PUBLICATIONS

Milosevic, N. et al.; "LTE and Wi-Fi Co-existence in 5 GHZ Unlicensed Band"; Sep. 2017; 11 pages.
(Continued)

*Primary Examiner* — Jung Liu
(74) *Attorney, Agent, or Firm* — Hewlett Packard Enterprise Patent Department

(57) ABSTRACT

Examples include classifying high frequency radio signals. Some examples include receiving a fast Fourier transform (FFT) of a high frequency radio signal, determining a first signal strength at a first guard frequency bin, determining a second signal strength at a second guard frequency bin, and determining a third signal strength at a direct current carrier frequency bin. Examples also include classifying the high frequency radio signal based on the first signal strength, the second signal strength, and the third signal strength.

18 Claims, 7 Drawing Sheets

(56) References Cited

U.S. PATENT DOCUMENTS

| | | | |
|---|---|---|---|
| 9,532,243 B2* | 12/2016 | Kim | H04W 24/02 |
| 9,668,263 B1 | 5/2017 | Tkach et al. | |
| 9,736,703 B2 | 8/2017 | Goldsmith et al. | |
| 2006/0014536 A1 | 1/2006 | Demirhan et al. | |
| 2011/0021153 A1 | 1/2011 | Saeid | |
| 2011/0317647 A1* | 12/2011 | Cho | H04L 5/0007 370/329 |
| 2012/0314598 A1* | 12/2012 | Sadek | H04W 16/14 370/252 |
| 2014/0064067 A1* | 3/2014 | Drewes | H04L 5/0044 370/230 |
| 2015/0056931 A1* | 2/2015 | Yerramalli | H04B 17/00 455/67.13 |
| 2015/0131536 A1* | 5/2015 | Kaur | H04L 5/001 370/329 |
| 2015/0208253 A1 | 7/2015 | Kim et al. | |
| 2015/0304872 A1* | 10/2015 | Sadek | H04W 24/10 370/252 |
| 2016/0007378 A1* | 1/2016 | Bertorelle | H04W 56/001 370/329 |
| 2016/0174233 A1* | 6/2016 | Emmanuel | H04W 24/08 370/252 |
| 2017/0048838 A1 | 2/2017 | Chrisikos et al. | |
| 2017/0085326 A1* | 3/2017 | Li | H04B 17/345 |
| 2017/0164364 A1* | 6/2017 | Song | H04W 4/70 |
| 2017/0264487 A1 | 9/2017 | Scahill et al. | |
| 2017/0272966 A1 | 9/2017 | Scahill et al. | |
| 2017/0273109 A1* | 9/2017 | Babaei | H04W 74/0808 |

OTHER PUBLICATIONS

Qualcomm Technologies, Inc.; "LTE in Unlicensed Spectrum"; Jun. 2014; 19 pages.
Zeng et al., "A first look at 802.11ac in action: Energy efficiency and interference characterization", In 2014 IFIP Networking Conference, Jun. 2014, pp. 1-9.
Yun et al., "Supporting WiFi and LTE Co-existence," In IEEE INFOCOM'15, 9 pages.
Yu et al., "Auction-Based Coopetition Between LTE Unlicensed and Wi-Fi", In IEEE Journal on Selected Areas in Communications, vol. 35, pp. 79-90, 2017, 12 pages.
"3GPP Release 13" available online at <https://www.etsi.org/deliver/etsi_en/301800_301899/301893/02.00.07_20/en_301893v020007a.pdf>, accessed Dec. 22, 2017, 123 pages.
Voicu et al., "Coexistence of Pico- and Femto-cellular LTE-unlicensed with Legacy Indoor Wi-Fi Deployments", IEEE International Conference on Communication Workshop (ICCW), Workshop on LTE in Unlicensed Bands: Potentials and Challenges, 2015, pp. 10041-10047.
T-Mobile Newsroom, "T-Mobile Continues to Boost Capacity for Customers with LTE-U Launching in Spring 2017", (webpage), available online at <https://web.archive.org/web/20170222212601/https://newsroom.t-mobile.com/news-and-blogs/lte-u-launch.htm>, Feb. 22, 2017, 2 pages.
Sur et al., "Practical MU-MIMO User Selection on 802.11Ac Commodity Networks", In ACM MOBICOM'16, 13 pages.
Sheshadri et al., "BLU: Blue-printing Interference for Robust LTE Access in Unlicensed Spectrum", CoNEXT '17, Proceedings of the 13th International Conference on emerging Networking EXperiments and Technologies, Dec. 12-15, 2017, Incheon, Republic of Korea, 13 pages.
Sagari, Shweta S., "Models and Algorithms for Spectrum Coexistence in Wireless Networks", (Research Paper), A dissertation submitted to the Graduate School, New Brunswick Rutgers, The State University of New Jersey in partial fulfillment of the requirements for the degree of Doctor of Philosophy, May 2016, 109 pages.
Rayanchu et al., "Fluid: improving throughputs in enterprise wireless lans through Flexible channelization", Mobile Computing, IEEE Transactions on, vol. 11, No. 9, 2012, pp. 1455-1469.

Rayanchu et al., "Catching whales and minnows using WiFiNet: deconstructing non-WiFi interference using WiFi hardware", In Proceedings of USENIX NSDI, 2012, 14 pages.
Rayanchu et al., "Airshark: detecting non-WiFi RF devices using commodity WiFi hardware", In Proceedings of ACM Internet Measurement Conference (IMC), 2011, pp. 137-154.
Rayanchu et al., "Airshark: detecting non-WiFi RF devices using commodity WiFi hardware", IMC '11 Proceedings of the 2011 ACM SIGCOMM conference on Internet measurement conference, 2011, 14 pages.
Pefkianakis et al., "MIMO Rate Adaptation in 802.11N Wireless Networks", In ACM MOBICOM'10, available online at <http://metro.cs.ucla.edu/papers/Pefkianakis.MOBICOM10.pdf>, 10 pages.
Olbrich et al., "WiPLUS: Towards LTE-U Interference Detection, Assessment and Mitigation in 802.11 Networks", In European Wireless 2017 (EW2017), 2017, 8 pages.
Martha DeGrasse, "Verizon starts nationwide LAA deployment", (webpage), available online at <https://www.rcrwireless.com/20170804/carriers/verizon-starts-nationwide-laa-deployment-tag4>, Aug. 4, 2017, 5 pages.
Makris et al., "Measuring lte and wifi coexistence in unlicensed spectrum", In 2017 European Conference on Networks and Communications (EuCNC), Jun. 2017, pp. 1-6.
"LTE-U Forum", available online at <https://web.archive.org/web/20170526112059/http://www.lteuforum.org/>, May 26, 2017, 1 page.
Julius Knapp., "OET Authorizes First LTE-U devices", available online at <https://www.fcc.gov/news-events/blog/2017/02/22/oet-authorizes-first-lte-u-devices>, 2 pages.
Jindal et al., LTE and Wi-Fi in Unlicensed Spectrum: A Coexistence Study, Google whitepaper, 2015, 25 pages.
Jian et al., "Coexistence of Wi-Fi and LAA-LTE: Experimental evaluation, analysis and insights", In IEEE ICCW'15, 8 pages.
"MulteFire", available online at <https://web.archive.org/web/20170510181640/http://www.multefire.org/>, May 10, 2017, 4 pages.
IEEE Standards Association, "IEEE Standards 802.11ac-2013: Enhancements for Very High Throughput for Operation in Bands below 6 GHz", 2013, available online at <https://standards.ieee.org/standard/802_11ac-2013.html>, 38 pages.
Guan et al., "CU-LTE: Spectrally-Efficient and Fair Coexistence Between LTE and Wi-Fi in Unlicensed Bands", In IEEE INFOCOM'16, 9 pages.
Giupponi et al., "Simulating LTE and Wi-Fi Coexistence in Unlicensed Spectrum with ns-3", available online at <https://arxiv.org/ftp/arxiv/papers/1604/1604.06826.pdf>, 12 pages.
"OpenEPC", available online at <https://web.archive.org/web/20170925015825/http://openepc.com/>, 2017, 3 pages.
Frederic Firmin, 3GPP MCC, "The Evolved Packet Core", available online at <https://web.archive.org/web/20170509040250/http://www.3gpp.org/technologies/keywords-acronyms/100-the-evolved-packet-core> May 9, 2017, 3 pages.
Extended European search report and Search Opinion Received for EP Application No. 18195827.3, dated Feb. 28, 2019, 9 pages.
Dino Flore, "3GPP & unlicensed spectrum", IEEE 802 Interim Session, Atlanta, Jan 11-16, 2015, 17 pages.
Christina Vlachou et al: "LTERadar", Proceedings of the ACM on Measurement and Analysis of Computing Systems, ACM, 2 Penn Plaza, Suite 701New YorkNY10121-8701USA, vol. 2, No. 2, Jun. 13, 2018 (Jun. 13, 2018), pp. 1-31.
Chai et al., "LTE in unlicensed spectrum: are we there yet?", MobiCom '16 Proceedings of the 22nd Annual International Conference on Mobile Computing and Networking, 2016, pp. 135-148.
Capretti et al., "LTE/Wi-Fi Co-existence Under Scrutiny: An Empirical Study", Proceedings of the Tenth ACM International Workshop on Wireless Network Testbeds, Experimental Evaluation, and Characterization, 2016, pp. 33-40.
Brenner et al., "Technical response to parties opposed to LTE unlicensed", In Qualcomm TR, 2015, 29 pages.
"Spectrum Analysis Overview", (webpage), Cisco-Meraki, available online at <https://web.archive.org/web/20160813010042/https://documentation.meraki.com/MR/Radio_Settings/Spectrum_Analysis_Overview>, Aug. 13, 2016, 2 pages.

(56) References Cited

OTHER PUBLICATIONS

Anwar et al., "Loss differentiation: Moving onto high-speed wireless LANs", IEEE INFOCOM 2014—IEEE Conference on Computer Communications, 2014, pp. 2463-2471.
André Cavalcante et al., "Performance Evaluation of LTE and Wi-Fi Coexistence in Unlicensed Bands", In IEEE VTC'13, 7 pages.
Ahmed, N. et al., Interference Mitigation in Enterprise WLANS Through Speculative Scheduling, (Research Paper), Proceedings of the 13th Annual ACM International Conference on Mobile Computing and Networking Sep. 9, 2007, pp. 342-345.
Abinader et al., "Enabling the coexistence of lte and wi-fi in unlicensed bands", IEEE Communications Magazine, vol. 52, Issue: 11, Nov. 2014, pp. 54-61.
"Spectrum Analysis" Chapter 34, Aruba Networks, available online at <https://web.archive.org/web/20170916204310/https://www.arubanetworks.com/techdocs/ArubaOS_61/ArubaOS_61_UG/Spectrum_Analysis.php>, Sep. 16, 2017, 46 pages.
European Search Report Received for EP Patent Application No. 19170913.8, dated Aug. 30, 2019, 10 pages.
Imtiaz Parvez et al: "CBRS Spectrum Sharing between LTE-U and Wi Fi: A Multiarmed Bandit Approach", Journal of Mobile Information Systems, vol. 2016, Jan. 1, 2016, 13 pages.

\* cited by examiner

HIGH FREQUENCY RADIO SIGNAL CLASSIFICATIONS

BACKGROUND

Long Term Evolution (LTE) may transmit signals in the unlicensed high frequency radio spectrum, such as in the 5 GHz frequency ranges. These LTE signals may interfere with other signals, such as that transmit in the same frequency ranges.

BRIEF DESCRIPTION OF THE DRAWINGS

The following detailed description references the drawings, wherein.

DETAILED DESCRIPTION

Figure 1:
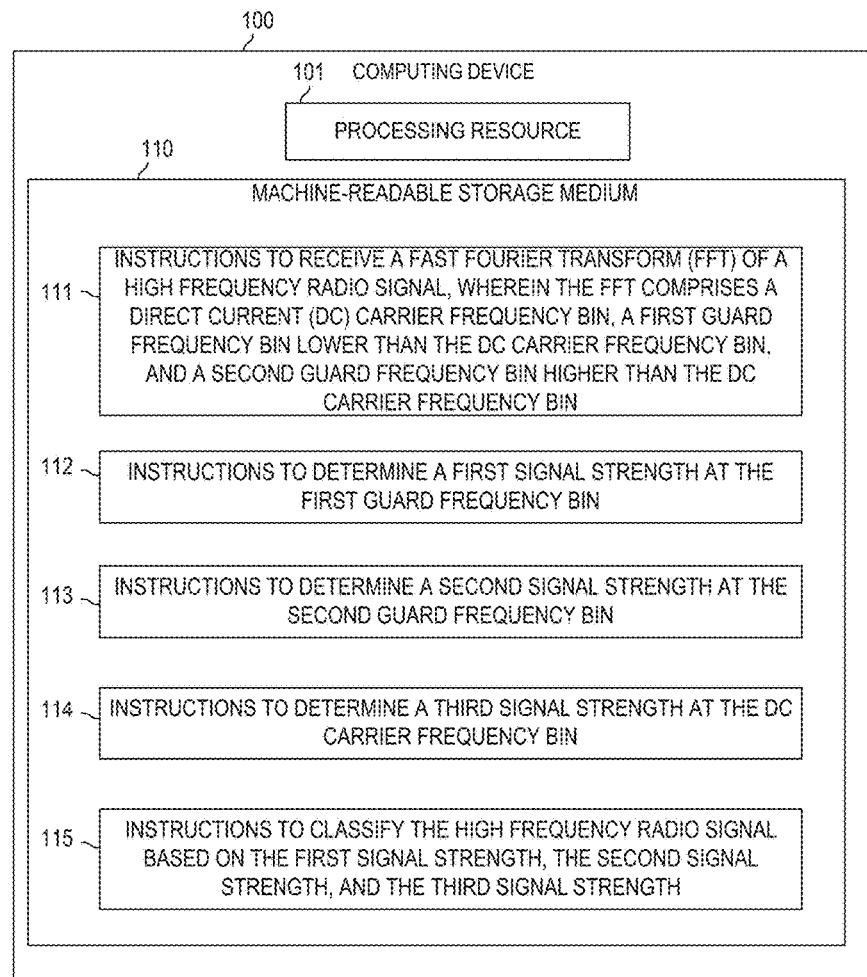
FIG. 1 is a block diagram of a computing device to classify a high frequency radio signal, according to some examples.

Many different types of technologies transmit information wirelessly through the transmission of radio waves in the radio frequency spectrum. However, much of the radio frequency spectrum is regulated by government bodies, such as the Federal Communications Commission (FCC). To access regulated areas of the spectrum, a license shall be approved by the government bodies, e.g., FCC. This area of the radio frequency spectrum is considered the licensed spectrum. Due to limits in the licensed spectrum, technologies that typically operate in the licensed spectrum are beginning to broaden and move into the unlicensed spectrum.

For example, cellphone providers have generally operated Long Term Evolution (LTE) in the providers' licensed spectrum, an area of the radio spectrum that is exclusively licensed to the cellphone providers. However, in an effort to boost coverage in cellular networks, these providers are beginning to expand their LTE network by operating their network in the unlicensed 5 GHz spectrum range.

The broadening of these technologies into the unlicensed spectrum may cause disruption to technologies that have historically operated in the unlicensed spectrum. For example, an IEEE 802.11a compliant W-Fi equipment may operate in the 5 GHz spectrum. The Wi-Fi equipment may be used in the operation of wireless local area networks (WLAN), etc. Thus, the operation of an LTE network in the unlicensed 5 GHz spectrum may cause disruption and interference in the Wi-Fi signals due to medium sharing, resource allocation, etc.

While LTE attempts to be a fair neighbor to Wi-Fi by sensing Wi-Fi transmissions and adapting accordingly, often times, LTE is unable to see Wi-Fi signals in dense Wi-Fi deployments. This may be due to the two technologies being unable to decode each other's signals or packets. Accordingly, the LTE access point may degrade a Wi-Fi signal without even being aware that it is doing so. A Wi-Fi access point may be unable to respond or adapt when it cannot detect an interfering LTE signal.

Examples disclosed herein address these challenges by providing a way for a network device, such as an access point, to classify interfering high frequency radio signals. In some examples, the network device may receive a fast Fourier transform (FFT) of a signal. It may analyze the fast Fourier transform (FFT) of the signal to classify the signal, focusing on areas in the FFT where Wi-Fi and LTE signals differ. In some examples, Wi-Fi and LTE signals differ in their behavior at their guard bands and at the direct current (DC) carrier. Accordingly, examples disclosed herein may determine the signal strengths at frequency bins in the FFT corresponding to these locations and classify the signal based on those signal strengths. Thus, examples disclosed herein provide a way for a Wi-Fi access point to understand whether a signal is an LTE signal without having to decode the LTE signal. This may make it possible for Wi-Fi access point to adapt accordingly in light of an interfering LTE signal.

In some examples, a computing device is provided with a non-transitory machine-readable storage medium. The non-transitory machine-readable storage medium includes instructions, that, when executed, cause a processing resource to receive a fast Fourier transform (FFT) of a high frequency radio signal. The FFT comprises a direct current carrier frequency bin, a first guard frequency bin lower than the direct current carrier frequency bin, and a second guard frequency bin higher than the direct current carrier frequency bin. The storage medium also stores instructions, that, when executed, cause the processing resource to determine a first signal strength at the first guard frequency bin, determine a second signal strength at the second guard frequency bin, determine a third signal strength at the direct current carrier frequency bin, and classify the signal. The classification is based on the first signal strength, the second signal strength, and the third signal strength.

In some examples, a computing device is provided with a non-transitory machine-readable storage medium. The non-transitory machine-readable storage medium includes instructions, that, when executed, cause a processing resource to receive a fast Fourier transform (FFT) of a high frequency radio signal, determine a maximum strength of the FFT, and determine a number of peaks in the FFT that exceeds a first threshold. The storage medium also includes instructions to determine a first signal strength at a first guard frequency bin and a second signal strength at a second guard frequency bin. This is in response to a determination that the maximum signal strength exceeds the first threshold and the number of local peaks exceeds a second threshold. The storage medium also includes instructions, that, when executed, cause the processing resource to determine a third signal strength at a direct current carrier frequency bin in response to a determination that the first signal strength and the second signal strength meet a third threshold. The storage medium also includes instructions, that, when executed, cause the processing resource to classify the radio frequency signal based on the third signal strength.

In some examples, a method is provided including receiving, at a network device, a first FFT of a high frequency radio signal; determining, by the network device, a first maximum strength of the first FFT; and determining, by the network device, a first number of local peaks in the first FFT that are above a first threshold. The method also includes receiving, at the network device, a second FFT of the high frequency radio signal; determining, by the network device, a second maximum strength of the second FFT; and determining, by the network device, a second number of local peaks in the second FFT that are above the first threshold. The method additionally includes determining, by the network device, an average FFT based on the first FFT and the second FFT in response to a determination that the first maximum and the second maximum both meet the first threshold and the first number and the second number both meet a second threshold. The method also includes classifying, by the network device, the high frequency radio signal based on a signal strength of the average FFT at a first guard frequency bin, a signal strength of the average FFT at a second guard frequency bin, and a signal strength of the average FFT at the direct current carrier frequency bin.

Referring now to the figures, FIG. 1 is a block diagram of a computing device 100 to classify a high frequency radio signal. As used herein, a high frequency radio signal is a radio signal of at least 2.4 GHz. In some examples, a high frequency radio signal is a radio signal of at least 5 GHz. In some examples, the high frequency radio signal operates in an unlicensed portion of the radio frequency spectrum. Many types of wireless communication technologies (e.g., Wi-Fi, Long Term Evolution (LTE), etc.) operate in these high frequencies. Accordingly, computing device 100 may detect and classify one type of high frequency radio signal from another type (e.g., classify a signal as being one type as opposed to another type). In some examples, the types of signals that computing device 100 may classify between are LTE signals and Wi-Fi signals.

As used herein, a "computing device" may be a server, a network device (e.g., an access point, etc.), chip set, desktop computer, workstation, or any other processing device or equipment. In some examples, computing device 100 may be a Wi-Fi access point.

Computing device 100 includes a processing resource 101 and a machine-readable storage medium 110. Machine readable storage medium 110 may be in the form of non-transitory machine-readable storage medium, such as suitable electronic, magnetic, optical, or other physical storage apparatus to contain or store information such as instructions 111, 112, 113, 114, 115, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

In the example of FIG. 1, instructions 111, 112, 113, 114, and 115 are stored (encoded) on storage medium 110 and are executable by processing resource 101 to implement functionalities described herein in relation to FIG. 1. In some examples, storage medium 110 may include additional instructions, like, for example, the instructions to implement some of the functionalities described in relation to computing device 200 in FIG. 2 or W-Fi access point 300 in FIG. 3. In other examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, 114, and 115 as described herein.

Instructions 111 may be executable by processing resource 101 to receive a fast Fourier transform (FFT) of a high frequency radio signal. The signal may be comprised of many frequencies components within a specific bandwidth. For example, the lowest-frequency signal component of the signal may be 5150 MHz and the highest-frequency signal component may be 5170 MHz. Thus, this signal ranges from 5150-5170 MHz and has a bandwidth of 20 MHz. An FFT is a representation of a time/space signal in its frequency domain, where the FFT provides both magnitude and phase information of the signal. In some examples, an FFT of a signal may be determined using samples of the signal and a Fourier transform. In some examples, the signal is sampled at discrete points and thus, the FFT provides magnitude readings at discrete points, called frequency bins.

As used herein, a frequency bin may be an arbitrary number that correlates to a specific frequency or frequency range in the signal. The lowest frequency bin in an FFT may correspond to the lowest frequency in the frequency band of that signal; the highest frequency bin may correspond to the highest frequency in the band of that signal; the middle frequency bin may correspond to the middle frequency in the band; etc. Thus, the order of the frequency bins in the FFT may correspond to the order of the frequencies in the signal. For example, 512 discrete points of a signal may allow for an FFT with 256 frequency bins. In a 20 MHz band signal with a lowest frequency of 5150 MHz and a highest frequency of 5170 MHz, the frequency bin of 1 may correspond to 5150 MHz and frequency bin 256 may correspond to 5170 MHz. As another example, 128 points of a signal may allow for an FFT with 64 frequency bins. Thus, in a 20 MHz band signal with a lowest frequency of 5150 MHz and a highest frequency of 5170 MHz, frequency bin 1 may correspond to 5150 MHz and frequency bin 64 may correspond to 5170 MHz. In some examples, the lowest frequency bin may not be 1 but it may be any arbitrary number (e.g., 0).

An LTE signal may have characteristics that distinguish it from other signals that operate in the same unlicensed frequency (e.g., W-Fi signal). For example, an LTE signal operating in the unlicensed 5 GHz frequencies may employ 20 MHz bandwidth as an effort to co-exist with Wi-Fi signals operating in close frequencies. Within a 20 MHz bandwidth, LTE uses 18 MHz for data and 2 MHz as guard bands. Guard bands are frequencies that are unused in the signal in order to prevent the signal from interfering with another signal. Thus, a guard band may act as a protective border or a book-end of a signal. An LTE signal may have one guard band of 1 MHz at one end of the frequency spectrum in the signal (i.e. the low 1 MHz guard band) and one guard band of 1 MHz at another end of the frequency spectrum in the signal (i.e. the high 1 MHz guard band). The location of these guard bands in an FFT and the signal strength at the locations may be used to help classify a detected signal as being LTE.

Accordingly, instructions 112 may be executable such that processing resource 101 determines a signal strength at a frequency bin in the FFT that corresponds to a guard band in the signal. This frequency bin may be characterized as a "guard frequency bin". Additionally, because an LTE signal has two guard bands, instructions 113 may be executable such that processing resource 101 determines a signal strength at a frequency bin corresponding to another guard band. Thus, one guard frequency bin may be characterized as a "first" guard frequency bin and the other guard frequency bin may be characterized as a "second" guard frequency bin. The signal strength at each may also be characterized as "first" and "second" signal strengths. Thus, the signal strength at the first guard frequency bin may be characterized as a "first" signal strength and the signal strength at the second guard frequency bin may be characterized as a "second" signal strength. Because the guard bands act as a protective border, one guard band is located at the lowest frequency in an LTE signal (i.e. low guard band) and the other guard band is located at the highest frequency in an LTE signal (i.e. high guard band).

By setting the guard frequency bins at bins that correspond to the guard bands in the signal and determining the signal strength of the FFT at those set guard frequency bins, signals that do not have a bandwidth of 20 MHz may be determined. These signals may be classified as not being LTE. It is noted that the guard frequency bins are bins that are predetermined bins. In other words, these bins are set to where the guard bands should be in a 20 MHz signal and may or may not correlate to actual guard bands in the signal being classified. For example, a 40 MHz signal may not have a guard band at the second guard frequency bin, but it will have a guard frequency bin in its FFT. As another example, a 20 MHz signal may have a guard band at the first guard frequency bin and a guard band at the second guard frequency bin.

In some examples, instructions 112 to determine a first signal strength may also include instructions to normalize the FFT before determining the first signal strength. This may be accomplished by dividing the signal strength at the first guard frequency bin in the FFT with the Euclidean norm of the FFT. Additionally, instructions 113 to determine a second signal strength may also include instructions to normalize the FFT before determining the second signal strength. This may be accomplished by dividing the signal strength at the second guard frequency bin in the FFT with the Euclidean norm of the FFT. The normalization of the FFT may help to reduce noise and inaccuracies in the FFT. Accordingly, the first signal strength and the second signal strength determined may be normalized signal strengths.

In some examples, instructions 112 may include instructions to determine the signal strengths at multiple frequency bins that correspond to the first guard band and average those signal strengths together to determine a signal strength of the first guard band. This is because many frequency bins may correspond to the first guard band depending on how the frequency bins in the FFT are spaced. For example, in an FFT with 256 samples, the lowest 12 frequency bins may all correspond to the first guard band. Thus, in some examples, any one of the lowest 12 frequency bins may be individually be used as the first guard frequency bin and the signal strength at that specific frequency bin may be used as the first signal strength. In other examples, the average of the signal strengths at these 12 lowest frequency bins may be used as the first signal strength. Similarly, instructions 113 may include instructions to determine the signal strengths at multiple frequency bins that correspond to the second guard band and average those signal strengths together to determine a signal strength of the first guard band. For example, in an FFT with 256 samples, the highest 12 frequency bins may all correspond to the second guard band.

Another distinguishing feature in an LTE signal may be the sub-carriers used by LTE. An LTE signal may aggregate a number of orthogonal frequency division multiplexing (OFDM) sub-carriers together to form the signal. OFDM may squeeze multiple modulated sub-carriers tightly together, reducing the required bandwidth of the signal, but keeping the modulated signals orthogonal so they do not interfere with each other. A sub-carrier in an LTE signal may be a direct current (DC) carrier. In a 20 MHz LTE signal, the DC carrier may have a distinct characteristic relative to other carriers.

Accordingly, instructions 114 may be executable such that processing resource 101 determines a signal strength at a frequency bin that correlates to a DC carrier frequency. This frequency bin may be characterized as a DC carrier frequency bin. In 20 MHz LTE signals, the frequency of the DC carrier is at the middle frequency of the bandwidth. For example, in a 20 MHz LTE signal with the lowest frequency of 5030 MHz, the DC carrier frequency is at 5040 MHz. Accordingly, in an FFT of 256 frequency bins (with frequency bin 1 being the lowest frequency bin), the DC carrier frequency bin is bin 128 As another example, in an FFT of 64 frequency bins, the DC carrier frequency bin is bin 32. By setting the DC carrier frequency bin to a bin that corresponds to the frequency location of the DC carrier and determining the signal strength of the FFT at that set frequency bin, signals that do not have the expected characteristic of LTE signal at the DC frequency bin may be classified as not being LTE. It is noted that the DC frequency bin is a predetermined bin of where the DC carrier should be in a LTE signal and may or may not correlate to an actual DC carrier in the signal being classified. The signal strength at the DC frequency bin may be characterized as a "third" signal strength relative to the first and second signal strength.

In some examples, instructions 114 to determine a first signal strength may also include instructions to normalize the FFT before determining the third signal strength. This may be accomplished by dividing the signal strength at the DC carrier frequency bin in the FFT with the Euclidean norm of the FFT.

Instructions 115 may be executable such that processing resource 101 classifies the high frequency radio signal based on the first signal strength, the second signal strength, and the third signal strength.

The signal strengths at the first guard frequency bin and the second guard frequency bin (the first and second signal strength, respectively) help classify signals that are not 20 MHz, making it less probable that the signal is an LTE. For example, in a 20 MHz LTE signal with the lowest frequency of 5030 MHz, the first guard band (the low guard band) may be from 5030-5031 MHz and the second guard band (the high guard band) may be from 5049-5050 MHz. In the FFT of that 20 MHz signal, the lowest frequency bin may correspond to 5030 MHz and the highest frequency bin may correspond to 5050 MHz. Because these guard bands are unused and thus no information should be sent over them, the amplitude at the guard frequency bins corresponding to these frequencies should be zero. In some examples, an FFT of a signal having an amplitude higher than 0 at these guard frequency bins shows that the signal is not a 20 MHz signal. For example, it could be a 40 MHz signal, an 80 MHz signal.

Thus, instructions 115 may cause processing resource 101 to determine that the signal is not LTE based on the first signal strength and/or the second signal strength having a signal strength higher than a threshold of 0. Additionally, instructions 115 may cause processing resource 101 to determine that the signal is a 20 MHz signal, and thus more likely to be LTE, based on the first signal strength and/or the second signal strength having a strength of 0.

In some examples, the threshold for the guard frequency bins is not 0 but is higher to provide an error margin. Additionally, the threshold may also depend on the resolution provided by the FFT. A high resolution FFT may have a lower threshold than a low resolution FFT. Thus, for example, in an FFT with 256 frequency bins, the threshold may be 0.005 while in an FFT with 64 frequency bins, the threshold may be 0.05. These numbers may be the normalized power as discussed above. The threshold for the first guard frequency bin and the second guard frequency bin may be characterized as a guard band threshold. As described herein, a signal strength is considered to be below a threshold if it describes a power that is weaker than the threshold. In terms of normalized power, a signal strength that is arithmetically smaller than the threshold is below the threshold (e.g., 0.004 is below a threshold of 0.005). A signal strength that "meets" the threshold may be equal to or be below the threshold.

Additionally, the signal strength at the DC carrier frequency bin (the third signal strength) further helps to classify signals as being either LTE or Wi-Fi. Both LTE and Wi-Fi use OFDM on the PHY layer, with multiple sub-carriers. With FFT, a frequency resolution that coincides with the sub-carrier spacing of a signal provides signal strength per sub-carrier. Due to the difference between the sub-carrier spacing between Wi-Fi and LTE, an FFT of a Wi-Fi signal shows a signal drop at the DC carrier frequency bin while an FFT of an LTE does not. The signal drop at the DC carrier frequency bin is relative to adjacent frequency bins. As used herein, a bin is adjacent to another bin if it is sequential to a bin. For example, frequency bin 6 is adjacent to bin 7 and bin 5. A third signal strength that is lower than the signal strength at adjacent bins indicates that the signal is Wi-Fi and not LTE. Additionally, the signal strength at the DC carrier frequency bin of a Wi-Fi signal is lower than the average signal strength of the FFT. In some examples, lower includes at least 70% lower.

In some examples, a third signal strength that is smaller than an average signal strength across the frequency bins of the FFT indicates that the signal is Wi-Fi and not LTE. Accordingly, in some examples, instructions 115 may include instructions that cause processing resource 101 to determine an average signal strength of the FFT. As used herein, an average of the FFT may be calculated by adding the signal strength at each frequency bin together and dividing that sum by the number of frequency bins.

Thus, instructions 115 may cause processing resource 101 to determine that the signal is LTE based on a third signal strength being lower than the signal strength at adjacent bins and/or lower than the average signal strength of the FFT. Additionally, instructions 115 may cause processing resource 101 to determine that the signal is a W-Fi based on a third signal strength being higher than the signal strength at adjacent bins and/or being higher than the average signal strength of the FFT.

In some examples, instructions 115 may cause processing resource 101 to take into account the first and second signal strengths first before taking into account the third signal strength. For example, the first and second signal strengths may be used to filter out signals that are not LTE. Because LTE uses signals with 20 MHz bandwidths in high frequencies (and specifically, frequencies in the 5 GHz range), signals that are not of 20 MHz bandwidths are not LTE signals. Instructions 115 may cause processing resource 101 to discard those signals based on the first and second signal strengths and classify them as Wi-Fi. Based on a determination that the first and second signal strengths indicate that a signal is 20 MHz, instructions 115 may cause processing resource 101 to take into account the third signal strength.

Figure 2:
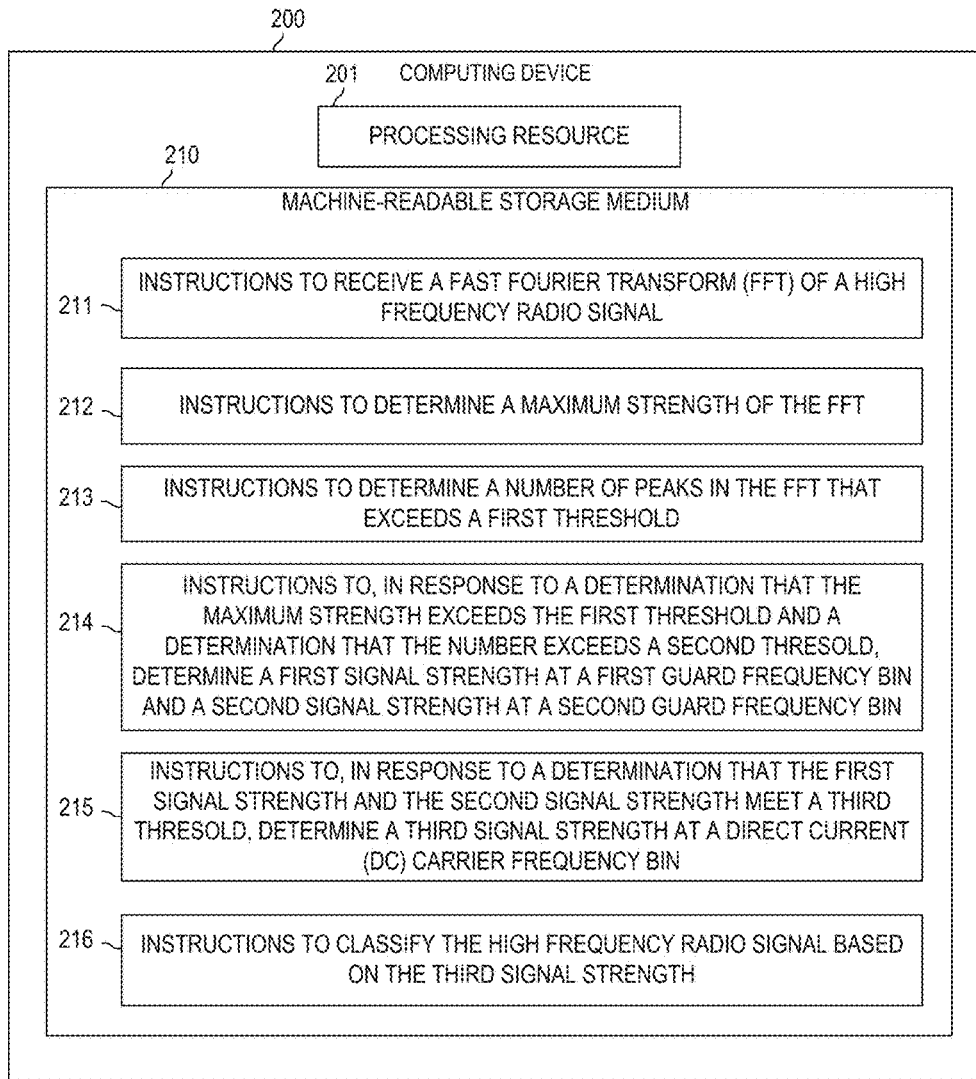
FIG. 2 is a block diagram of a computing device to classify an RF signal, according to some examples.
Figure 3:
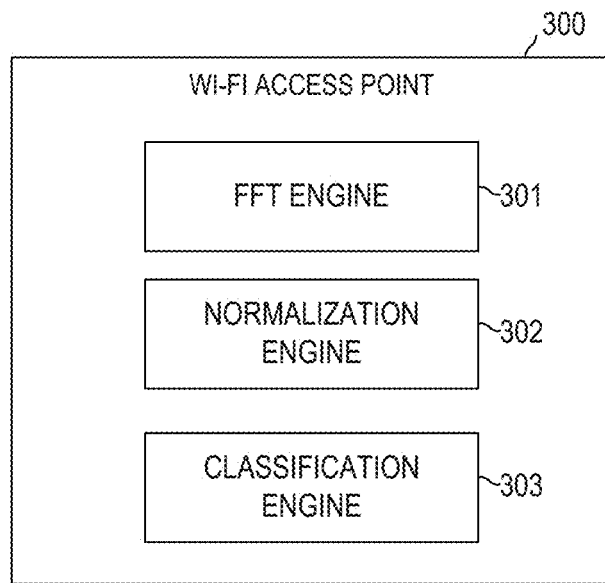
FIG. 3 is a block diagram of a Wi-Fi access point that classifies RF signals, according to some examples.

Computing device 100 of FIG. 1, which is described in terms of processors and machine-readable storage mediums, can include one or more structural or functional aspects of computing device 200 of FIG. 2, or Wi-Fi access point 300 of FIG. 3, which is described in terms of functional engines containing hardware and software.

FIG. 2 is a block diagram of a computing device 200 to classify a high frequency radio signal. Computing device 200 is similar to computing device 100. Computing device 200 includes a processing resource 201 and a machine-readable storage medium 210. Processing resource 201 is similar to processing resource 101 and machine-readable storage medium 210 is similar to machine-readable storage medium 110. Instructions 211, 212, 213, 214, 215, and 216 are stored (encoded) on storage medium 210 and are executable by processing resource 201 to implement functionalities described herein in relation to FIG. 2.

Instructions 211 may be executable by processing resource 201 to receive a FFT of a high frequency radio signal. In some examples, the high frequency radio signal may be a 5 GHz radio signal. Instructions 211 are similar to instructions 111 and the discussion above in relation to instructions 111 is applicable here.

Instructions 212 may be executable by processing resource 201 to determine a maximum strength of the FFT. As used herein, a maximum strength includes the highest signal strength of the FFT. This may be characterized as a global peak of the FFT or a maxima of the FFT. In some examples, instructions 212 may accomplish this by looking through the amplitudes of the FFT and marking the highest signal reading as the maximum strength. Some signals are not strong enough to be a cause of interference. As discussed in relation to instructions 214, computing device 200 may use this maximum strength of the FFT to filter out signals that are not interfering.

Instructions 213 may be executable by processing resource 201 to determine a number of peaks in the FFT that are above a threshold. As used herein, peaks in the FFT includes frequency bins in which the signal strength at adjacent bins on the both sides of the frequency bin is lower than the signal strength at the frequency bin. For example, the signal strength at frequency bin 100 may be −100 dBm, the signal strength at frequency bin 101 may be −80 dBm, and the signal strength of frequency bin 102 may be −100 dBm. This would indicate that there is a "peak" at frequency bin 101 of −80 dBm. As another example, the signal strength at frequency bin 104 may be −85 dBm, the signal strength at frequency bin 105 may be −67 dBm, and the signal strength of frequency bin 106 may be −50 dBm. This would indicate that there is no peak amongst frequency bins 104, 105, and 106. These peaks may be characterized as local peaks. The global peak (as discussed in relation to instructions 212) may also be a local peak. As used herein, a number may include any number including 0, 1, 2, 3, etc. In other words, instructions 213 may determine how many, if any, peaks there are in the FFT that are above a specific threshold.

The threshold may be set where, above that signal strength, a signal is considered to be interfering. As discussed above, an FFT may have different number of frequency bins. A higher number of frequency bins provide a higher resolution of the signal. A lower number of frequency bins provide a lower resolution of the signal. In some examples, the specific threshold may depend on the resolution of the FFT. According to Parseval's Theorem, the total energy of a signal is the same for any FFT resolution. Thus, as the resolution of the FFT increases, the signal strength at each frequency bin may decrease. In some examples, where the FFT has 256 frequency bins, the threshold may be −89 dBm. In another examples, where the FFT has 64 frequency bins, the threshold may be −85 dBm.

As discussed above, LTE signals are OFDM. A signal that is OFDM may include multiple peaks that are at or above the specific threshold. Accordingly, as discussed in relation to instructions 214, computing device 200 may use the number of peaks in the FFT to help filter out signals that are not OFDM and thus, not LTE.

Instructions 214 may be executable by processing resource 201 to determine a signal strength at a first guard frequency bin and a second signal strength at a second guard frequency bin. This determination may be in response to a determination that the maximum strength (as determined by instructions 212) exceeds a strength threshold and the number (as determined by instructions 213) exceeds a number threshold.

The strength threshold may be the same as the threshold used in instructions 214 to determine which peak to count in "the number." Accordingly, in some examples, where the FFT has 256 frequency bins, the strength threshold may be −89 dBm. Additionally, in other examples, where the FFT has 64 frequency bins, the strength threshold may be −85 dBm. A signal strength is considered to exceed a threshold if it describes a signal strength (i.e. power) that is stronger than the threshold. In terms of dBM units, a smaller negative number (e.g. −30 dBm) is stronger than a bigger negative number (−90 dBm).

The number threshold may be a number that, when the number of peaks is above this number, indicates that the signal is an OFDM signal. In some examples, the number threshold may be 10. In some examples, the number threshold may be dependent on the FFT sample received and may be varied dependent on factors such as FFT resolution, etc. For example, an OFDM signal being represented by a higher resolution FFT may have more peaks as compared an OFDM signal that is being represented by a lower resolution FFT. In some examples, the number may be changed and adapted based on the individual characteristics of the equipment being used to provide the FFT using machine learning. In some examples, machine learning may include first baseline of rules for a computing device to follow, allowing the computing device to make determinations based on those rules, and verifying the determinations of the computing device, and modifying the rules if needed.

Thus, instructions 212 may cause processing resource 201 to determine that an FFT with 256 frequency bins has a maximum strength of −67 dBM. Additionally, instructions 213 may cause processing resource 101 to determine that an FFT with 256 frequency bins has 11 peaks (each peak has a strength of at least −85 dBm). Instructions 214 may compare the maximum strength to the strength threshold and determine that it exceeds the threshold. Instructions 214 may also compare the number of peaks to the number threshold and determine that it exceeds the threshold. Based on these determinations, instructions 214 may cause processing resource 101 to determine a signal strength at a first guard frequency bin and a second signal strength at a second guard frequency bin. However, based on a determination that an FFT does not have a maximum strength exceeding the strength threshold, instructions 214 may cause processing resource 101 to determine that the signal is not an interfering signal and ignore the signal. Additionally, based on a determination that an FFT has 10 peaks, instructions 214 may cause processing resource 201 to determine that the signal is not an OFDM signal and thus not LTE. In some examples, the strength threshold may be characterized as a first threshold and the number threshold may be characterized as a second threshold as a mechanism to discriminate between the thresholds.

The first signal strength, the second signal strength, the first guard frequency bin, and the second guard frequency bin are similar to the first signal strength, the second signal strength, the first guard frequency bin, and the second guard frequency bin, respectively, as discussed in relation to instructions 111, 112, and 113. Additionally, as discussed above, a normalization of power of an FFT may help to alleviate inaccuracies in the sampling. As such, instructions 214 may also include instructions executable by processing resource 101 to normalize the FFT in response to a determination that the maximum strength exceeds the first threshold and a determination that the number exceeds a second threshold. Accordingly, the maximum strength and the number of peaks (in instructions 212 and 213) are determined on the FFT and the first signal strength and the second signal strength are determined on the normalized FFT.

Instructions 215 may be executable by processing resource 201 to determine a third signal strength at a direct current carrier frequency bin. This determination may be in response to a determination that the first signal strength and the second signal strength (in instructions 214) meet a guard band threshold. The third signal strength is similar to the third signal strength described above in relation to instructions 114. The DC carrier frequency bin is similar to the DC carrier frequency bin described above in relation to instructions 114. The guard band threshold is similar to the guard band threshold described above in relation to instructions 115

Thus, instructions 214 may cause processing resource 201 to determine that an FFT with 256 frequency bins has a first signal strength of 0.005 and a second signal strength of 0.004. Instructions 215 may cause processing resource to determine that these signal strengths meet the threshold of 0.005. In response to this determination, instructions 215 may cause processing resource 101 to determine a third signal strength at the DC carrier frequency bin. However, based on a determination that the FFT has a first signal strength higher than 0.005 (e.g., 0.0055, 0.006, etc.), instructions 215 may cause processing resource 101 to determine that the signal is not 20 MHz and classify the signal as Wi-Fi.

Instructions 216 may be executable by processing resource 201 to classify the radio frequency signal based on the third signal strength. This is similar to the third signal strength described above in relation to instructions 115.

As discussed above, an FFT may have different number of frequency bins. A higher number of frequency bins provide a higher resolution of the signal. A lower number of frequency bins provide a lower resolution of the signal. Thus, the signal strength readings may depend on the resolution of the signal (i.e. the number of frequency bins). In a high resolution FFT, more readings of additional frequency bins may be provided.

Thus, in some examples, in a high resolution FFT, instructions 216 may be executable by processing resource 201 to classify based on the third signal strength (at the DC frequency bin), and signal strengths at two additional frequency bins. The first additional frequency bin may correlate to the low guard band of the signal (as described above) and the second additional frequency bin may correlate to the high guard band of the signal (as described above).

These additional frequency bins are used because LTE technology employs a certain amount of sub-carriers when operating in a specific bandwidth. For example, on a 20 MHz bandwidth, LTE uses 2048 sub-carriers, with a 15 KHz sub-carrier spacing. This leaves 2 MHz for guard bands, as discussed above. Wi-Fi, on the other hand, provisions for 64 sub-carries, with a sub-carrier spacing of 312.5 KHz. This provides a total used bandwidth of 17.8 MHz and 2.2 MHz used as guard bands. Thus, the difference in the guard bands of the two signals differ in 0.2 MHz (0.1 MHz on each border of the signal). Accordingly, the guard bands for a W-Fi signal may span across a wider frequency range than the guard bands used for LTE.

Thus, the additional frequency bin for the low guard band may be located at a frequency bin that correlates to the highest frequency of the low guard band for an expected 20 MHz Wi-Fi signal. For example, a low guard band of a 20 MHz signal beginning at 5030 MHz starts at 5030 MHz. In an LTE signal, the low guard band may be from 5030-5031 MHz. In a Wi-Fi signal, the low guard band may be from 5030-5031.1 MHz. Thus, the additional frequency bin for the low guard band may correlate to 5031.1 MHz. This additional frequency bin may be characterized as a third guard frequency bin. Because this additional frequency bin is correlated to the low guard band, this third frequency bin is lower than the DC frequency bin. In some examples, this frequency bin may be determined by 14×N/256, where N is the frequency bins in the FFT. Thus, in an FFT with 256 frequency bins (N=256), this frequency bin may be located at bin 14. The signal strength at this additional frequency bin may be characterized as a fourth signal strength.

Similarly, the additional frequency bin correlated to the high guard band may be located at a frequency bin that correlates to the lowest frequency of the high guard band for an expected 20 MHz Wi-Fi signal. For example, a high guard band of a 20 MHz signal beginning at 5030 starts at 5049 MHz. In an LTE signal, the low guard band may be from 5030-5031 MHz. In a Wi-Fi signal, the low guard band may be from 5030-5031.1 MHz. Thus, the additional frequency bin for the low guard band may correlate to 5031.1 MHz. This additional frequency bin may be characterized as a fourth frequency bin. Because this additional frequency bin is correlated to the high guard band, this fourth frequency bin is higher than the DC frequency bin. In some examples, this frequency bin may be determined by 244× N/256, where N is the frequency bins in the FFT. Thus, in an FFT with 256 frequency bins (N=256), this frequency bin may be located at bin 244. The signal strength at this additional frequency bin may be characterized as a fifth signal strength.

The classification of the signal may be based on the third signal strength (at the DC carrier frequency bin) and the fourth signal strength (at the low guard band). Based on the determination that the third signal strength is below a threshold (i.e. the DC carrier threshold), instructions 216 on storage medium 210 may cause processing resource 201 to further look at the fourth signal strength. Based on a determination that the fourth signal strength is below another threshold (i.e. low guard band threshold), instructions on storage medium 210 may cause processing resource 201 to classify the signal as a Wi-Fi signal. Based on a determination that the fourth signal strength is at or exceeds the low guard band threshold, instructions on storage medium 210 may cause processing resource 201 to classify the signal as LTE signal.

Thus, when the third signal strength is below the DC carrier threshold, the classification of the signal may be based on the third signal strength and the fourth signal strength. However, based on a determination that the third signal strength is at or exceeds the DC carrier threshold, instructions on storage medium 210 may cause processing resource 201 to further look at the fifth signal strength (at the high guard band) instead of the fourth signal strength. Based on a determination that the fifth signal strength is below another threshold (high guard band threshold), instructions on storage medium 210 may cause processing resource 201 to classify the signal as a W-Fi signal. Based on a determination that the fifth signal strength is at or exceeds the high guard band threshold, instructions on storage medium 210 may cause processing resource 201 to classify the signal as LTE signal.

In some examples, the DC carrier threshold may be 0.039. In some examples, the low guard threshold may be 0.010. In some examples, the high guard threshold may be 0.019. In some examples, these thresholds may be changed and adapted based on the individual characteristics of the equipment being used to provide the FFT using machine learning. In some examples, machine learning may include providing a baseline of rules for a computing device to follow, allowing the computing device to make determinations based on those rules, verifying the determinations of the computing device, and modifying the rules if needed.

In an FFT providing a low resolution, such as an FFT with 64 frequency bins, it may not be possible to determine the fourth signal strength and the fifth signal strength that correspond to the low guard band and the high guard band due to the low resolution. Thus, in a low resolution FFT, storage medium 201 may include instructions that are executable to cause processing resource 201 to look at other characteristics of a Wi-Fi signal. These instructions may be programmed such that they are executed before the execution of 214, 215, and 216. These instructions may thus help to filter out the amount of signals that may be processed by 214, 215, and 216. Accordingly, these instructions may be executed by processing resource 201 on the FFT and not a normalized FFT.

The instructions may be executable by processing resource 201 to determine whether peaks exist at pre-determined frequency bins. These pre-determined frequency bins may correlate to the legacy short training field (L-STF) in a W-Fi signal. The L-STF signal is a signal that is transmitted by Wi-Fi before it starts its data transmissions. In an L-STF, there are signal peaks that occur at 12 known frequencies. A signal transmitted by Wi-Fi has a legacy short training field signal and a signal transmitted by LTE does not. Thus, instructions on storage medium 201 may cause processing resource 210 to determine the signal strengths at frequency bins that correspond to the frequencies known to have peaks in an L-STF. These frequency bins may be characterized as L-STF frequency bins. In some examples, these frequency bins may be defined by the Wi-Fi community (e.g., IEEE 802.11 standard). In some example, the signal strengths are determined to determine whether there are peaks existing in the signal at the L-STF frequency bins. Thus, in some examples, the signal strength at L-STF frequency bins relative to the signal strengths at the adjacent bins may help to classify the signal.

A peak may be determined by looking at the signal strengths of adjacent bins of the L-STF frequency bin. If the signal strengths at bins adjacent to the L-STF frequency bin are lower than the signal strength at an L-STF frequency bin, then there is a peak at that specific L-STF bin. If the signal strengths at adjacent bins are higher or equal to the signal strength at an L-STF bin, then there is not a peak at that L-STF bin. Based on a determination that there are 12 peaks, each at an L-STF frequency bin, instructions are executable by processing resource 201 to classify that signal as Wi-Fi. A signal that is classified as being Wi-Fi may not go through further analyzation (i.e., instructions 214, 215, and 216). Based on a determination that there are not 12 peaks at the L-STF frequency bins, instructions are executable by processing resource 201 to determine a first signal strength at a first guard frequency bin and a second signal strength at a second guard frequency bin, as described above in relation to instructions 214. Accordingly, the peaks at L-STF frequency bins may be determined before the FFT is normalized. In some examples, a signal with at least 8 peaks (one peak at at least 8 out of 12 of the L-STF frequency bins) may be classified as a Wi-Fi signal. This allows for sampling error.

Thus, accordingly, in some examples, instructions stored on storage medium 210 may include instructions to determine what resolution is provided by the FFT. Based on a determination that the resolution provided by the FFT is high (at least 100 KHz, e.g., 100 KHz, 90 KHz, 80 KHz, etc.), instructions on storage medium 210 may determine an additional signal strength at an additional frequency bin correlated to the low guard band and an additional signal strength at an additional frequency bin correlated to the high guard band. Based on a determination that the resolution provided by the FFT is low (higher than 100 KHz, e.g. 110 KHz, 120 KHz), instructions on storage medium 210 may determine a signal strengths at the L-STF frequency bins.

Computing device 200 of FIG. 2, which is described in terms of processors and machine-readable storage mediums, can include one or more structural or functional aspects of computing device 100 of FIG. 1, or W-Fi access point 300 of FIG. 3, which is described in terms of functional engines containing hardware and software. For example, computing device 200 may have instructions to implement the functionalities of normalization engine 302 as described in relation to FIG. 3.

FIG. 3 illustrates a block diagram of a Wi-Fi access point 300. In some examples, access point 300 may connect to a wired router/switch/hub via an Ethernet cable and project a Wi-Fi signal to a designated area, creating a wireless local area network (WLAN). Wi-Fi access point 300 includes an FFT engine 301, a normalization engine 302, and a classification engine 303. Each of these aspects of Wi-Fi access point 301 will be described below. Other engines can be added to Wi-Fi access point 301 for additional or alternative functionality.

Each of engines 301, 302, 303, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, Wi-Fi access point 300 may include additional engines.

Each engine of Wi-Fi access point 300 can include at least one machine-readable storage mediums (for example, more than one) and at least one computer processor (for example, more than one). For example, software that provides the functionality of engines on Wi-Fi access point 300 can be stored on a memory of a computer to be executed by a processor of the computer.

FFT engine 301 is an engine of W-Fi access point that includes a combination of hardware and software that allows W-Fi access point to receive an FFT of a signal. As discussed above, the signal may be a high frequency radio signal. In some examples, the high frequency radio signal may be a channel in a specific frequency range. For example, the signal may be transmitted on channel 7 in the 5 GHz frequency range. As another example, the signal may be transmitted on channel 50 in the 5 GHz frequency range. FFT engine 301 may implement the functionalities as described in relation to instructions 211. In some examples, FFT engine 301 allows W-Fi access point 300 to receive multiple FFTs of the same signal (e.g., a first FFT, a second FFT, a third FFT). In some examples, these FFTs may be of the same resolution as each other.

Normalization engine 302 is an engine of W-Fi access point 300 that includes a combination of hardware and software that allows W-Fi access point 300 to determine a maximum strength of the FFT. Normalization engine 302 also allows W-Fi access point 300 to determine a number of peaks in the FFT that exceeds a first threshold. Accordingly, normalization engine 302 may implement the functionalities as described in relation to instructions 212 and 213. As discussed above, FFT engine 301 may receive multiple FFTs of the same signal. Accordingly, normalization engine 302 may determine the maximum strength of each FFT and determine a number of peaks in each FFT. Normalization engine 302 may then normalize each FFT and average the FFTs based on a determination that the FFTs within a certain time period meet the criteria of maximum threshold and peak numbers. For example, the time period may be set at 1 microsecond. FFT engine 301 may receive FFTs of the signal for 1 microsecond. Normalization engine 302 may determine the maximum strength of each FFT received in the microsecond. Normalization engine 302 may also determine the number of peaks of each FFT received in the microsecond. Based on a determination that a certain percentage of FFTs received in the microsecond has: 1) a maximum strength exceeding the strength threshold, and 2) a number of peaks exceeding the number threshold, normalization engine 302 may normalize each FFT and average all the FFTs to determine an average FFT to represent the FFTs received in that time period. The percentage may be 100% (e.g., all FFTs received in the microsecond), or a majority (51%), etc. Based on a determination that a certain percentage of FFTs received in the microsecond does not meet condition 1 and/or 2, then the time period starts over and resets.

Classification engine 303 is an engine of W-Fi access point 300 that includes a combination of hardware and software that allows Wi-Fi access point 300 to determine a first signal strength at a first guard frequency bin and a second signal strength at a second guard frequency bin. In some examples, the determination may be made on the average FFT as determined by normalization engine 302. Classification engine 303 may also allow Wi-Fi access point 300 to determine a third signal strength at a DC carrier frequency bin based on a determination that the first signal strength and the second signal strength meet a third threshold. Additionally, classification engine 303 may classify the radio frequency signal based on the third signal strength. Thus, classification engine 303 may implement the functionalities as described in relation to instructions 214, 215, and 216.

In some examples, FFT engine 301 may determine whether the FFTs are a low resolution FFTs or a high resolution FFTs. This determination may affect normalization engine 302 and classification engine 303. Based on a determination that the FFTs received provide low resolution, normalization engine 302 may look at the signal strengths at the L-STF frequency bins of the FFTs received within the preset time period. Based on a determination that a certain percentage of the FFTs do not have peaks at the L-STF frequency bins (and meet the peak threshold and number threshold, as discussed above), normalization engine 302 may normalize and average the FFTs as discussed above. Based on a determination that the FFTs received provide high resolution, normalization engine 302 does not look at the L-STF frequency bins.

Based on the determination of FFT engine 301 that the FFTs received provide high resolution, classification engine 303 may determine a fourth signal strength at a third guard frequency bin and a fifth signal strength at a fourth guard frequency bin, as discussed above in order to help classify the signal. The fourth signal strength and the fifth signal strength may be based on the average FFT determined by normalization engine 302.

Wi-Fi access point 300 of FIG. 3, which is described in terms of functional engines containing hardware and software, can include one or more structural or functional aspects of computing device 100 of FIG. 1, or computing device 200 of FIG. 2, which is described in terms of processors and machine-readable storage mediums.

Figure 4:
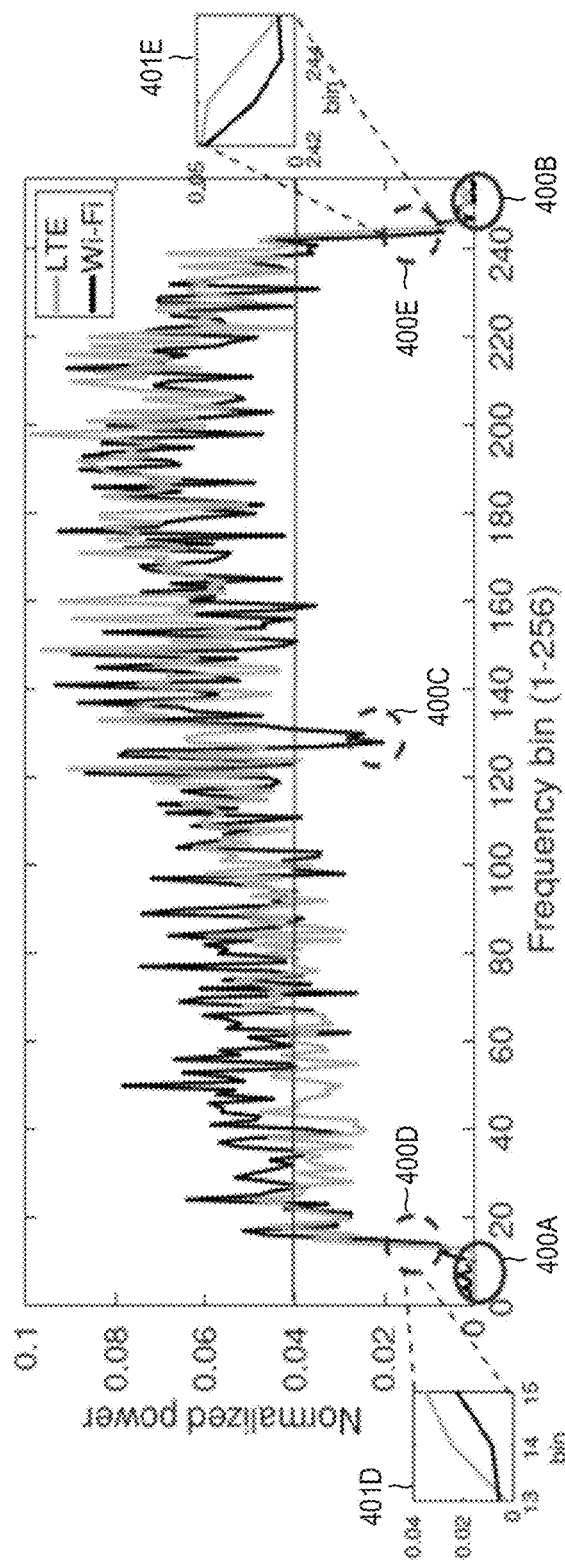
FIG. 4 shows LTE and Wi-Fi FFTs, according to some examples.

FIG. 4 shows an FFT of a 20 MHz LTE signal (which is depicted by a gray line) and an FFT of a 20 MHz Wi-Fi signal (which is depicted by a black line), both with 256 frequency bins. Both FFTs have been normalized. Accordingly, the unit for the x-axis is frequency bins and the unit for the y-axis is normalized power. 400A marks a low guard band area and 400B marks a high guard band area. Because the LTE signal and the W-Fi signal are both 20 MHz, both FFTs have low normalized power in areas 400A and 400B. 400C marks a DC carrier area. As shown by FIG. 4, the Wi-Fi FFT has a power drop at that area and the LTE FFT does not. Accordingly, this area may be used to help distinguish the LTE FFT from the Wi-Fi FFT.

400D marks an additional frequency bin area correlated with the low guard band area and 400E marks an additional frequency bin area correlated with the high guard band area. 401D shows a close-up of 400D. 401E shows a close-up of 400E.

As shown by 401D, the low guard band of the Wi-Fi signal spans across more frequency bins than the low guard band of the LTE signal. Similarly, as shown by 401E, the high guard band of the Wi-Fi signal spans across more frequency bins than the high guard band of the LTE signal. Accordingly, these areas may be used to help distinguish the LTE FFT from the Wi-Fi FFT.

Figure 5:
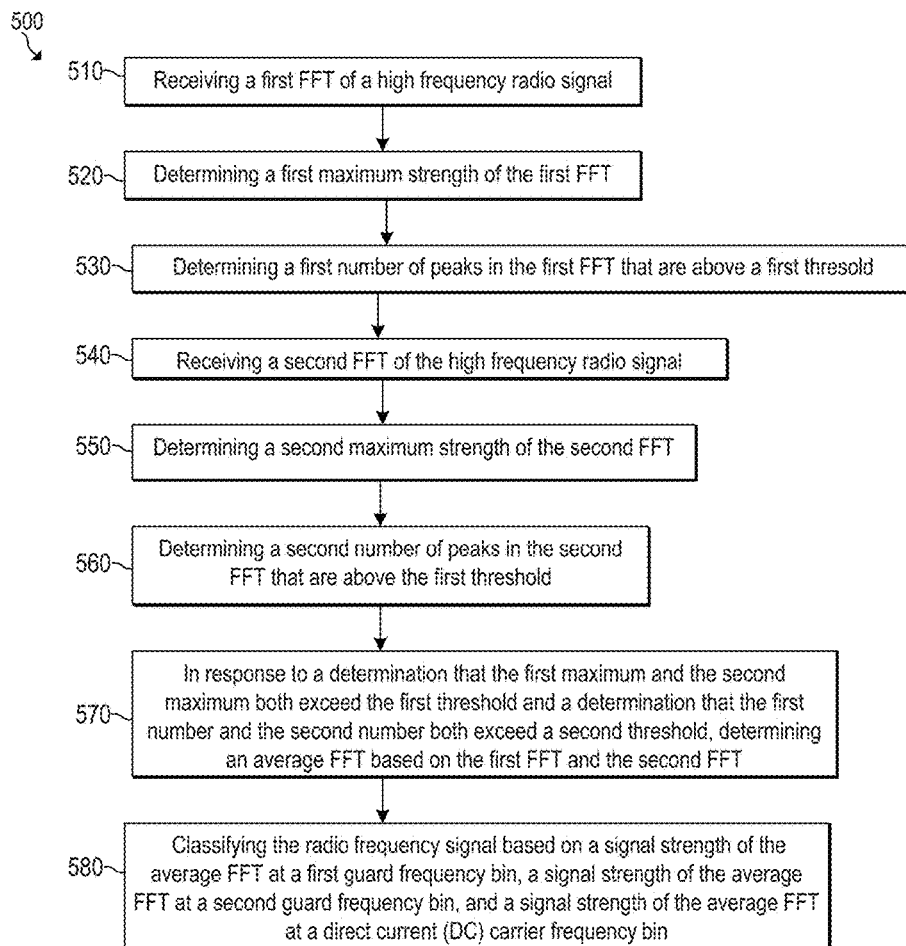
FIG. 5 is a flowchart of a method of classifying a high frequency radio signal, according to some examples.

FIG. 5 illustrates a flowchart for a method 500 to classify a high frequency radio signal. Although execution of method 500 is described below with reference to Wi-Fi access point 300 of FIG. 3, other suitable devices for execution of method 300 can be utilized (e.g., computing device 100 of FIG. 1 or computing device 200 of FIG. 2). Additionally, implementation of method 500 is not limited to such examples and can be used for any suitable devices or system described herein or otherwise.

At 510 of method 500, FFT engine 301 receives a first FFT of a high frequency radio signal. As discussed above, the high frequency radio signal may be on a specific channel in the 5 GHz range. At 520 of method 500, normalization engine 302 determines a first maximum strength of the first FFT. At 530, normalization engine 302 determines a first number of peaks in the first FFT that are above a first threshold. As described above, the first threshold may be a strength threshold. In some examples, for a 5 GHz signal, the threshold may be −85 dBm. At 540, FFT engine 301 receives a second FFT of the high frequency radio signal. At 550, normalization engine 302 may determine a second maximum strength of the second FFT. At 560, normalization engine 560 may determine a second number of peaks in the second FFT that are above the first threshold. At 570, normalization engine 302 may determine an average FFT based on the first FFT and the second FFT. 570 may be in response to a determination the first maximum and the second maximum both meet the first threshold and a determination that the first number and the second number both meet a second threshold. In some examples, normalization engine 302 may normalize the first FFT and normalize the second FFT before averaging the first FFT and the second FFT to get an average FFT.

At 580, classification engine 303 may classify the high frequency radio signal based on the signal strength of the average FFT at a first guard frequency bin, a signal strength of the average FFT at a second guard frequency bin, and a signal strength of the average FFT at a DC carrier frequency bin. First guard frequency bin, second guard frequency bin, and DC carrier frequency bin are similar to those discussed above in relation to FIG. 1.

Although the flowchart of FIG. 5 shows a specific order of performance of certain functionalities, method 500 is not limited to that order. For example, some of the functionalities shown in succession in the flowchart may be performed in a different order, may be executed concurrently or with partial concurrence, or a combination thereof. In some examples, 540 may be started before 520 is completed. Additionally, while FIG. 5 specifically mentions a first FFT and a second FFT, there may be additional FFTs that are received (e.g., 8 additional FFTs). For example, a third FFT may be received and analyzed before 570. 570 is then performed in response to the additional FFTs also having a maximum strength above the first threshold and a number of peaks that is above the second threshold. The average determined in 570 is then based on the first FFT, the second FFT, and any additional FFTs.

Figure 6:
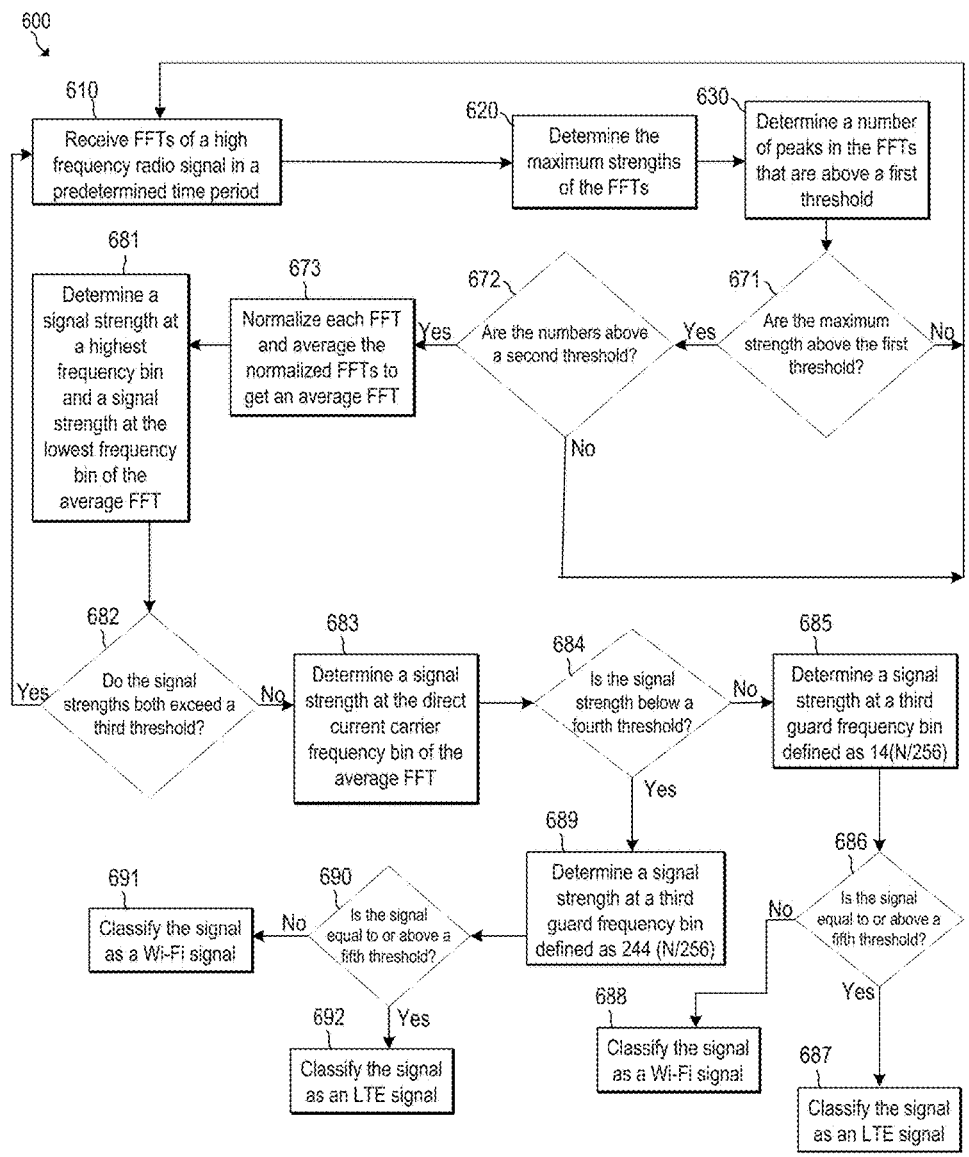
FIG. 6 is a flowchart of a method of classifying a 5 GHz signal using an FFT with a resolution of at least 100 KHz, according to some examples.

FIG. 6 is a flowchart of a method of classifying a high frequency radio signal using a high resolution FFT. Although execution of method 600 is described below with reference to W-Fi access point 300 of FIG. 3, other suitable devices for execution of method 600 can be utilized (e.g., computing device 100 of FIG. 1 or computing device 200 of FIG. 2). Additionally, implementation of method 600 is not limited to such examples and can be used for any suitable devices or system described herein or otherwise.

At 610, FFT engine 301 receives FFTs of a high frequency radio signal over a predetermined time period. As discussed above, this predetermined time period may be for 1 microsecond. The FFTs received may provide a high resolution of the radio signal. At 620, normalization engine 302 determines the maximum strengths of each of the FFTs received at 610. At 630, normalization engine 302 determines a number of peaks for each FFT that are above a first threshold. Accordingly, each FFT will have a number that identifies how many peaks each FFT has that are above the first threshold. As discussed above, this first threshold may be a strength threshold. At 671, normalization engine 302 determines whether the maximum strength of each FFT is above the first threshold. This first threshold is the same threshold used in 630. Based on a determination that each FFT received in the predetermined time period has a maximum strength that is above the first threshold, method proceeds to 672. Based on a determination that at least one FFT (out of all the FFT received in the predetermined time period at 610) has a maximum strength that meets (i.e. is equal or is below) the first threshold, method moves back to 610 to receive new FFTs. The old FFTs are discarded.

Referring back to 672, normalization engine 302 determines if the number of peaks of each FFT are above a second threshold. As discussed above in relation to instructions 214, this second threshold may be the number threshold and indicate that the signal is an OFDM signal. In other words, at 672, normalization engine 302 determines if each FFT received in the predetermined time period has enough peaks. Based on a determination that each FFT has enough peaks, method proceeds to 673. Based on a determination that at least one FFT (out of the FFTs received in the predetermined time period at 610) has a number of peaks that meets (equal to or is below) the second threshold, method moves back to 610 to receive new FFTs. The old FFTs are discarded.

Referring back to 673, normalization engine 302 normalizes each FFT received in the predetermined period and then averages the normalized FFTs to get an average FFT. At 681, classification engine 303 determines a signal strength at a highest frequency bin of the average FFT and a signal strength at the lowest frequency bin of the average FFT. The highest frequency bin may correspond to a high guard band of the signal and the lowest frequency bin may correspond to a low guard band of the signal. In other examples, and as described above in relation to instructions 112 and 113, classification engine 303 may determine a signal strength at all of the frequency bins that correspond to the low guard band in the average FFT (the 12 lowest frequency bins) and average those signal strengths to determine a signal strength for the low guard band. Additionally, classification engine 303 may determine a signal strength at all of the frequency bins that correspond to the high guard band in the average FFT (the 12 highest frequency bins) and average those signal strengths to determine a signal strength for the high guard band. Those signal strengths may then be used at 682.

At 682, classification engine 303 determines if the signal strengths determined at 681 exceeds a third threshold. This third threshold may be a guard band threshold, as discussed above. Based on a determination that either signal strengths exceeds the third threshold, method returns back to 610 to receive new FFTs. The old FFTs are discarded. This is because this indicates that the signal is not 20 MHz and thus cannot be LTE operating in a high frequency.

Based on a determination that both signal strengths meets (equal to or below) the third threshold, method moves to 683. At 683, classification engine 303 determines a signal strength at a DC carrier frequency bin of the average FFT. At 684, classification engine 303 determines whether the signal strength at the DC carrier frequency bin is below a fourth threshold. The fourth threshold may be the DC carrier threshold (0.039), as discussed above. Based on a determination that the signal strength (determined at 683) is equal to or exceeds the fourth threshold, method proceeds to 685. Based on a determination that the signal strength (determined at 683) is below the fourth threshold, method proceeds to 689.

At 685, classification engine 303 looks at an additional frequency bin correlated to the low guard band of the signal. This may be characterized as a third guard frequency bin. In some examples, this guard frequency bin may be defined as 14×N/256, where N is the number of frequency bins in the average FFT. At 686, classification engine 303 determines whether the signal strength (determined at 685) is equal to or above a fifth threshold. This fifth threshold is the low guard band threshold, as discussed above. In some examples, this fifth threshold is 0.010. Based on a determination that the signal strength determined at 685 is equal to or above the fifth threshold, method 600 proceeds to 687, where classification engine 303 classifies the signal as an LTE signal. Based on a determination that the signal strength determined at 685 is below the fifth threshold, method 600 proceeds to 688, where classification engine 303 classifies the signal as a Wi-Fi signal.

Referring back to 684, based on a determination that the signal strength (determined at 683) is below the fourth threshold (i.e. DC carrier threshold), method proceeds to 689. At 689, classification engine 303 looks at an additional frequency bin correlated to the high guard band of the signal. This may also be characterized as a third guard frequency bin. In some examples, this guard frequency bin may be defined as 244×N/256, where N is the number of frequency bins in the average FFT. At 690, classification engine 303 determines whether the signal strength (determined at 689) is equal to or above a fifth threshold. The fifth threshold, in this context, is the high guard band threshold. In some examples, the fifth threshold is 0.019. Based on a determination that it is equal to or above the fifth threshold, method 600 proceeds to 692, where classification engine 303 classifies the signal as an LTE signal. Based on a determination that it is below the fifth threshold, method 600 proceeds to 691, where classification engine 303 classifies the signal as a W-Fi signal.

Although the flowchart of FIG. 6 shows a specific order of performance of certain functionalities, method 600 is not limited to that order. For example, some of the functionalities shown in succession in the flowchart may be performed in a different order, may be executed concurrently or with partial concurrence, or a combination thereof.

Figure 7:
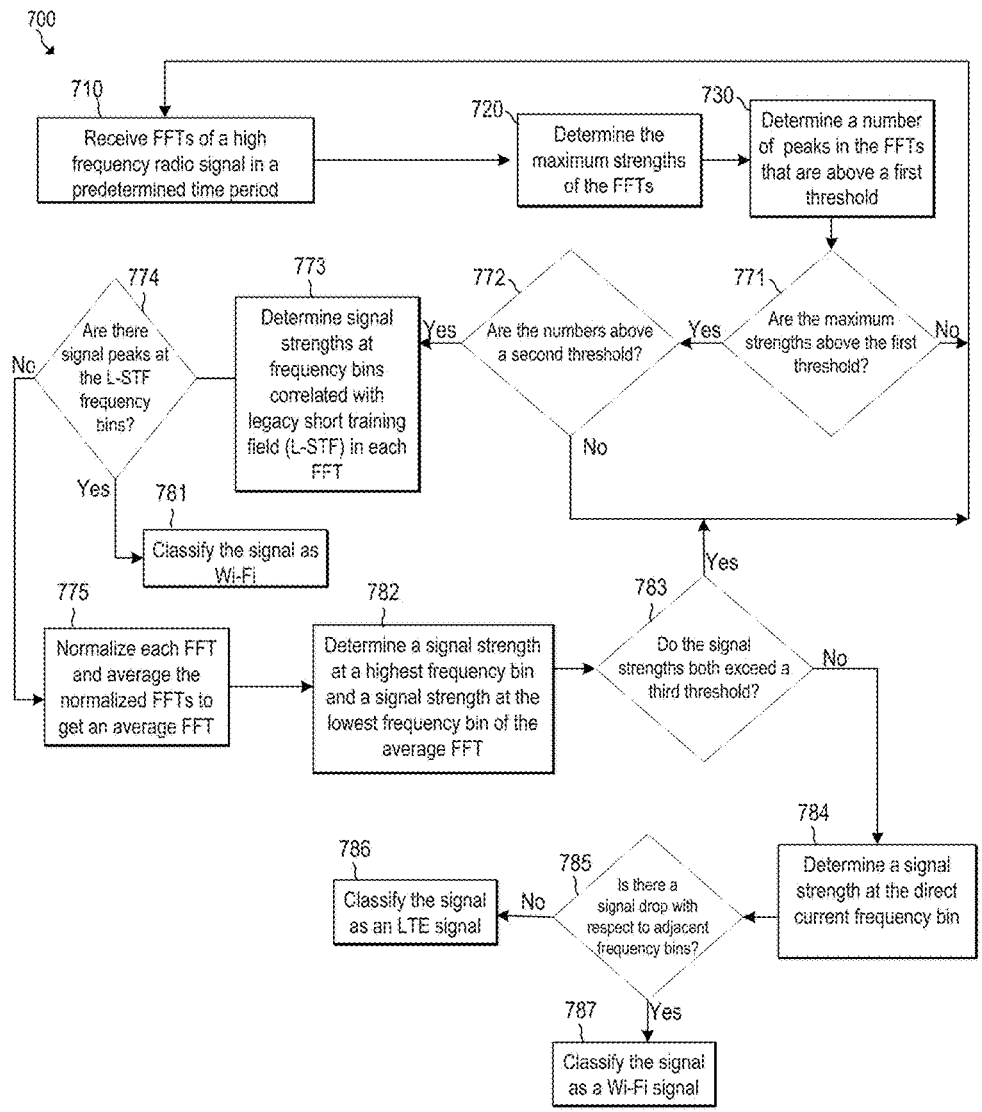
FIG. 7 is a flowchart of a method of classifying a 5 GHz signal using an FFT with a resolution lower than 100 KHz, according to some examples.

FIG. 7 is a flowchart of a method of classifying a high frequency radio signal using a low resolution FFT. Although execution of method 700 is described below with reference to Wi-Fi access point 300 of FIG. 3, other suitable devices for execution of method 700 can be utilized (e.g., computing device 100 of FIG. 1 or computing device 200 of FIG. 2). Additionally, implementation of method 600 is not limited to such examples and can be used for any suitable devices or system described herein or otherwise.

710, 720, 730, 771, and 772 are similar to 610, 620, 630, 671, and 672, respectively, except that the resolution provided by FFTs in method 700 is a low resolution.

Because the FFTs provide low resolution, at 773, normalization engine 302 may determine signal strengths at frequency bins correlated with the legacy short training field (L-STF) in each FFT received at 710. This allows W-Fi access point 300 to filter out signals that are W-Fi. At 774, normalization engine 300 determines whether each FFT has peaks at the L-STF frequency bins. Based on a determination that each FFT has at least 8 peaks (for at least 8 out of the 12 L-STF frequency bins), method proceeds to 781, where classification engine 303 classifies the signal as a W-Fi signal.

Based on a determination that at least one FFT (received at 710) does not have the peaks at the L-STF frequency bin (e.g. one FFT has only 7 peaks at 7 out of the 12 L-STFT frequency bins), method proceeds to 775. At 775, normalization engine normalizes each FFT received in the predetermined period and then averages the normalized FFTs to get an average FFT.

782 of method 700 is similar to 681 of method 600. 783 of method 700 is similar to 682 of method 600, except that in an FFT with 64 frequency bins, the 3 lowest frequency bins all correspond to the low guard band and the 3 highest frequency bins all correspond to the high guard band. 784 of method 700 is similar to 683 of method 600. At 785, classification engine 303 determines whether there is a signal strength drop at the DC carrier frequency bin (determined at 784) relative to adjacent bins of the direct current carrier frequency bins. Adjacent bins, as described above, are applicable here. Based on a determination that there is not a signal drop with respect to adjacent bins, method proceeds to 787, where classification engine 303 classifies the signal as an LTE signal. Based on a determination that there is a signal strength drop with respect to adjacent bins, method proceeds to 786, where classification engine 303 classifies the signal as a Wi-Fi signal.

Although the flowchart of FIG. 7 shows a specific order of performance of certain functionalities, method 700 is not limited to that order. For example, some of the functionalities shown in succession in the flowchart may be performed in a different order, may be executed concurrently or with partial concurrence, or a combination thereof.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions, that, when executed, cause a processing resource to:
   receive a fast Fourier transform (FFT) of a high frequency radio signal;
      wherein the FFT comprises a direct current (DC) carrier frequency bin, a first guard frequency bin lower than the DC carrier frequency bin, a second guard frequency bin higher than the DC carrier frequency bin, and a third guard frequency bin lower than the DC carrier frequency bin;
      wherein the high frequency radio signal comprises a 5 GHz signal and the FFT provides a resolution of at least 100 KHz;
   determine a first signal strength at the first guard frequency bin;
   determine a second signal strength at the second guard frequency bin;
   determine a third signal strength at the DC carrier frequency bin;
   determine a fourth signal strength at the third guard frequency bin;
   classify the high frequency radio signal based on the first signal strength, the second signal strength, the third signal strength, and the fourth signal strength.

2. The storage medium of claim 1, wherein the signal is classified as Long Term Evolution (LTE) based on the first signal strength meeting a guard band threshold; the second signal strength meeting the guard band threshold, and the third signal strength being below a DC threshold.

3. The storage medium of claim 1, wherein the first guard frequency bin corresponds to a low 1 MHz guard band in the signal; and
wherein the second guard frequency bin corresponds to a high 1 MHz guard band in the signal.

4. The storage medium of claim 1, wherein the first guard frequency bin is associated with a beginning of a guard band in the signal and the third guard frequency bin is associated with an end of the guard band.

5. The storage medium of claim 1, wherein the classification is based on a fifth signal strength at a fourth guard frequency bin that is higher than the DC carrier frequency bin.

6. The storage medium of claim 5, wherein the second guard frequency bin is associated with a beginning of a guard band in the signal and the third guard frequency bin is associated with an end of the guard band.

7. The storage medium of claim 1, wherein the FFT comprises a maximum signal strength; and
wherein the classification is based on the maximum signal strength exceeding a strength threshold.

8. The storage medium of claim 1, wherein the FFT comprises a number of peaks that exceed a strength threshold; and
wherein the classification is based on the number of peaks.

9. A non-transitory machine-readable storage medium comprising instructions, that, when executed, cause a processing resource to:
   receive an FFT of a high frequency radio signal;
   determine a maximum strength of the FFT;
   determine a number of peaks in the HT that exceeds a first threshold;
   in response to a determination that the maximum strength exceeds the first threshold and a determination that the number exceeds a second threshold, determine a first signal strength at a first guard frequency bin and a second signal strength at a second guard frequency bin;
   in response to a determination that the first signal strength and the second signal strength meet a third threshold, determine a third signal strength at a direct current (DC) carrier frequency bin; and
   classify the high frequency radio signal based on the third signal strength.

10. The storage medium of claim 9, wherein the signal is classified as LTE based on the third signal strength being above a threshold.

11. The storage medium of claim 9, wherein the high frequency radio signal comprises a 5 GHz signal;
wherein the FFT comprises a resolution of at least 100 KHz;

wherein the storage medium comprises instructions, that, when executed, cause the processing resource to determine a fourth signal strength at a third guard frequency bin that is lower than the direct currency frequency bin; and wherein the classification is based on the fourth signal strength.

12. The storage medium of claim 9, wherein the high frequency radio signal comprises a 5 GHz signal;

wherein the FET comprises a resolution of at least 100 KHz;

wherein the storage medium comprises instructions; that, when executed, cause the processing resource to determine a fourth signal strength at a third guard frequency bin that is higher than the direct currency frequency bin; and wherein the classification is based on the fourth signal strength.

13. The storage medium of claim 9, wherein the high frequency radio signal comprises a 5 GHz signal;

wherein the FFT comprises a resolution lower than 100 KHz; and wherein the storage medium comprises instructions, that, when executed, cause the processing resource to determine a signal strengths at legacy short training field (L-STF) frequency bins in the FFT; and wherein the classification is based on the signal strength at each L-STF frequency bin.

14. A method comprising:

receiving at a network device, a first FFT of a high frequency radio signal;

determining, by the network device, a first maximum strength of the first FFT;

determining, by the network device, a first number of peaks in the first FFT that exceeds a first threshold;

receiving, at the network device, a second FFT of the high frequency radio signal;

determining, by the network device, a second maximum strength of the second WI;

determining, by the network device, a second number of peaks in the second FFT that exceeds the first threshold;

in response to a determination that the first maximum strength and the second maximum strength both exceed the first threshold and a determination that the first number and the second number both exceed a second threshold:

determining, by the network device, an average FFT based on the first FFT and the second ITT; and classifying, by the network device, the high frequency radio signal based on a signal strength of the average ITT at a first guard frequency bin, a signal strength of the average FFT at a second guard frequency bin, and a signal strength of the average FFT at a direct current (DC) carrier frequency bin.

15. The method of claim 14, wherein the first FFT provides a low resolution of the high frequency radio signal;

wherein the second FFT provides a low resolution of the high frequency radio signal;

wherein the method comprises:

determining, by the network device, signal strengths at legacy short training field frequency bins in the first FFT; and determining, by the network device, signal strengths at legacy short training field frequency bins in the second FFT.

16. The method of claim 14, wherein the normalized FFT comprises a resolution of at least 100 KHz; and wherein the classification of the type is based on a signal strength of the average FFT at a third guard frequency bin that is lower than the direct current frequency bin.

17. The method of claim 14, wherein the normalized FFT comprises a resolution of at least 100 KHz; and wherein the classification of the type is based on a signal strength of the average FFT at a third guard frequency bin that is higher than the direct current frequency bin.

18. The method of claim 14, wherein the high frequency radio signal is classified as an LIE signal.

* * * * *